(12) United States Patent
Ehlers et al.

(10) Patent No.: US 8,131,505 B2
(45) Date of Patent: Mar. 6, 2012

(54) METHOD FOR COMPUTER-AIDED ANALYSIS OF THE RELIABILITY OF A TECHNICAL SYSTEM, CORRESPONDING DEVICE, AND A CORRESPONDING TECHNICAL SYSTEM

(75) Inventors: Petra Ehlers, Baar-Ebenhausen (DE); Wolfram Klein, Neubiberg (DE); Ariane Sutor, Gräfelfing (DE)

(73) Assignee: Siemens Aktiengesellschaft, Munich (DE)

( * ) Notice: Subject to any disclaimer, the term of this patent is extended or adjusted under 35 U.S.C. 154(b) by 511 days.

(21) Appl. No.: 11/992,711

(22) PCT Filed: Sep. 4, 2006

(86) PCT No.: PCT/EP2006/065968
§ 371 (c)(1),
(2), (4) Date: Apr. 14, 2009

(87) PCT Pub. No.: WO2007/039371
PCT Pub. Date: Dec. 4, 2007

(65) Prior Publication Data
US 2009/0222239 A1    Sep. 3, 2009

(30) Foreign Application Priority Data

Sep. 30, 2005   (DE) .................. 10 2005 046 945

(51) Int. Cl.
*G06F 11/30* (2006.01)
*G21C 17/00* (2006.01)

(52) U.S. Cl. ......... 702/182; 702/183; 702/184; 702/185

(58) Field of Classification Search .......... 702/182–189, 702/191, 121–123
See application file for complete search history.

(56) References Cited

U.S. PATENT DOCUMENTS

| | | | |
|---|---|---|---|
| 2002/0113792 A1* | 8/2002 | Pena-Nieves et al. | 345/440 |
| 2003/0034995 A1* | 2/2003 | Osborn et al. | 345/713 |
| 2004/0044442 A1* | 3/2004 | Bayoumi et al. | 700/286 |
| 2004/0117051 A1* | 6/2004 | Ford | 700/109 |

OTHER PUBLICATIONS

Sues, System reliability and sensitive factors via the MPPSS method, Jun. 2005.*
Sues R. H. et al., "System reliability and sensitivity factors via the MPPSS method," Probabilistic Engineering Mechanics, Computational Mechanics Publications, Southampton, FR, vol. 20, No. 2, Apr. 2005, pp. 148-157.*

(Continued)

*Primary Examiner* — Phuong Huynh (57) ABSTRACT

The invention relates to a method for the computer-assisted analysis of the reliability of a technical system comprising a plurality of technical components. According to the method, the reliabilities of the components are respectively described by a component function that depends on at least one parameter and a parameter interval of the at least one parameter, which is associated with the components and influences the reliability of the components; a system reliability of the technical system is determined from the reliabilities of the components; a variation value is respectively determined for at least some of the components f&, constituting a value for the variation of the system reliability according to the variation of the parameter interval of the respective component; and an influence quantity relating to the influence of the respective components on the system reliability is respectively determined for at least some of the components from the variation value.

11 Claims, 5 Drawing Sheets

OTHER PUBLICATIONS

Ou, Y.: Dugan, J.B. Sensitivity analysis of modular dynamic fault trees. In: Proceedings IEEE International Computer Performance and Dependenability Symposium 2000, IPDS 2000. Los Alamitos: IEEE, 2000, pp. 35-43.*

Awtry M. H. et al., "Logistics engineering workstations for concurrent engineering applications", Aerospace and Electronics Conference, 1991, NAECON 1991, Proceedings of the IEEE 1991, National Dayton, OH, USA, May 20-24, 1991, New York, NY, USA, pp. 1253-1259.

Schneidewind N. F., "Modelling the fault correction process", Software Reliability Engineering, 2001, ISSRE 2001, Proceedings 12th International Symposium on Nov. 27-30, 2001, Piscataway, NJ, USA, IEEE, pp. 185-190.

Ou, Y.: Dugan, J.B. Sensitivity analysis of modular dynamic fault trees. In: Proceedings IEEE International Computer Performance and Dependability Symposium 2000, IPDS 2000. Los Alamitos: IEEE, 2000, pp. 35-43. ISBN 0-7695-0553-8.

* cited by examiner

METHOD FOR COMPUTER-AIDED ANALYSIS OF THE RELIABILITY OF A TECHNICAL SYSTEM, CORRESPONDING DEVICE, AND A CORRESPONDING TECHNICAL SYSTEM

CROSS REFERENCE TO RELATED APPLICATIONS

This application is the US National Stage of International Application No. PCT/EP2006/065968, filed Sep. 4, 2006 and claims the benefit thereof. The International Application claims the benefits of German application No. 10 2005 046 945.0 filed Sep. 30, 2005, both of the applications are incorporated by reference herein in their entirety.

FIELD OF INVENTION

The invention relates to a method for computer-aided analysis of the reliability of a technical system, together with a corresponding device and a corresponding technical system.

BACKGROUND OF THE INVENTION

Technical systems often comprise numerous individual technical components, the functions of which depend on parameters, and in particular parameter intervals, which are assigned to the technical components. The size of the corresponding parameter intervals for the individual components influences, in particular the reliability of the individual components. Here and in what follows the term reliability is to be understood in a general sense, which can include any type of variable which provides an expression in any desired way of how robustly the system is running at a particular point in time. For example, the reliability is described by a system reliability function. For any point in time, this function specifies the probability of the system functioning uninterruptedly up to this point in time. Here, the expected value of the system reliability function is often used a characteristic value which specifies the reliability.

Because technical systems nowadays comprise a large number of sub-components, it is desirable to determine in a simple manner what alterations, in particular in the case of the maintenance of individual components, have the greatest effect on the overall reliability of the technical system when the technical system is in operation.

For the purpose of determining the failure characteristics of technical systems, so-called fault-tree analyses are known from the prior art. With these, the individual components of the technical system are combined with each other in a fault tree by means of a Boolean algebra. The Boolean algebra reflects the effect which the failure of a component or a fault in a component, as applicable, has on the stability of the overall technical system. This fault tree analysis is a statistical analysis, using which it is only possible to predict whether there is an overall failure of the system if corresponding faults arise in one or more sub-components.

SUMMARY OF INVENTION

The object of the invention is therefore to create a method for analyzing the reliability of a technical system, which is able to determine dynamically, and in particular as a function of time, changes to the reliability of the technical system as a function of the subcomponents of the system.

In the inventive method, the reliability of the individual technical components of the technical system is in each case described by a component function, which depends on at least one parameter and one parameter interval, which is assigned to the component and which influences the reliability of the component, for the at least one parameter. From these component reliabilities, a system reliability is determined for the technical system and after this, for each of at least some of the components, a change magnitude is determined which is a measure of the change in the system reliability as a function of the change in the parameter interval for the component concerned. Finally, the change magnitude for each of at least some of the components is used to determine a factor for the effect of the component concerned on the system reliability.

The invention is based on the knowledge that by a determination of the change in the system reliability as a function of the change in the parameter interval for the individual components of the system it is possible to determine in a simple way which of the individual components has the greatest effect on the technical system. Hence, in a preferred embodiment of the invention, from the change factors determined at least one component is identified which has a greater effect on the system reliability than other components, in particular which has the greatest effect of all the components.

The method in accordance with the invention has the advantage that the reliability and the system availability of critical components can be explicitly determined. From this it is then possible to determine strategies for how the technical system should be monitored or maintained, as applicable, when in operation. In particular, possibilities ensue for selectively maintaining technical components of the system, and hereby achieving an optimum between cost and availability/reliability in the operation of the technical system.

In a further particularly preferred embodiment, time is used as the at least one parameter, in order thereby to determine the dynamics over time of the reliability of the technical system. In particular, the parameter intervals assigned to the components relate to predetermined time intervals where, in a particularly preferred embodiment, the time intervals represent maintenance intervals for the technical components of the system. By a determination of the effect of the individual maintenance intervals on the overall system it is possible, with the help of the inventive method, to achieve optimization objectives so that the maintenance intervals in the overall system are as long as possible. However, the technical system can also, if necessary, be optimized in respect of other optimization objectives. Examples of other optimization objectives are the preferential replacement of "easily accessible components" or the preferential replacement of "low-cost components". Another objective might be the preferential replacement of only those components for which the improved failure probability after replacement delivers a significantly greater improvement in the overall system failure probability for the system than for the other components.

The individual component functions of the technical system will preferably be represented by probability distribution functions which are adequately known from the prior art, which are known to describe very well the failure probabilities. Here, consideration will be given to such distributions as the Weibull distribution and/or the gamma distribution and/or the lognormal distribution and/or the exponential distribution.

A fault tree, in which the reliabilities of the components are combined together by a Boolean algebra, will preferably already exist for the technical system. This fault tree can then be used in the inventive method.

In a particularly preferred embodiment of the invention, each of the change magnitudes is the derivative of the system reliability, determined in the method, with respect to the parameter interval concerned. This makes it possible very simply to calculate the change magnitude numerically or analytically.

In a particularly preferred embodiment of the invention the integrals, with respect to the at least one parameter, of the change magnitude for the component concerned will be considered as the factor describing the effect of the component concerned on the system reliability. The factors for the components could equally be in each case the maximum value of the absolute value of the change magnitude for the component concerned in an interval of the at least one parameter. However, the factors can also be represented by the absolute value of the change magnitude at a predefined value of the at least one parameter.

The inventive method can be applied in any chosen technical systems. Thus it could be considered, for example, for power stations, in particular the steam turbines in power stations, or also for control systems such as a motor controller.

Apart from the method described above, the invention relates further to a device, for the computer-aided analysis of a technical system, which has appropriate facilities for carrying out the inventive method. The invention also relates to a technical system which incorporates such a device.

The invention comprises in addition a computer program product with program code, stored on a machine-readable medium, for carrying out the inventive method when the program is executed on a computer.

BRIEF DESCRIPTION OF THE DRAWINGS

Exemplary embodiments of the invention are described in detail below by reference to the attached figures.

These show:

FIG. 9 and

DETAILED DESCRIPTION OF INVENTION

In the embodiments of the invention described below, consideration is given to technical systems which have components, the reliability of which is described by so-called basic functions where the basic functions represent the probability of a failure of the component concerned as a function of the operating time t of the technical system. Here, the failure probability depends in addition on a corresponding maintenance interval for the technical component. The operating time t thus corresponds to the parameter in the sense of the independent claim and the maintenance interval corresponds to the parameter interval in the sense of independent claim.

In the embodiments described below, each basic function for a technical component is described by an exponential distribution, which reads as follows:

$$f(t,t_0) = 1 - e^{-\lambda \cdot (t \bmod t_0)} \quad (1)$$

Here, $\lambda$ is a parameter specific to the corresponding technical component, t is the operating time of the technical system and $t_0$ is the maintenance interval for the component under consideration. t mod $t_0$ represents the modulo function. The characteristics of the function given in (1) will be described in more detail by reference to FIG. 2.

Figure 1:
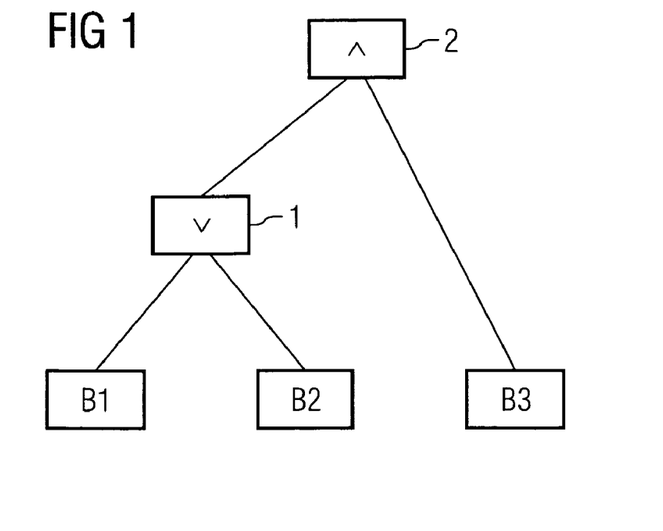
FIG. 1 a diagram showing an example of the combination of three technical components in a technical system, using a Boolean algebra, in the form of a fault tree.

FIG. 1 shows an example of a technical system which comprises three technical components B1, B2 and B3. All three technical components are described by the basic function of equation (1), where however the maintenance intervals of the individual components can be different. The diagram in FIG. 1 corresponds to a so-called fault tree. According to this fault tree, the technical components B1 and B2 are linked together by an OR disjunction 1, where this OR disjunction is in turn linked with the technical component B3 by an AND conjunction 2. This fault tree describes the following fault scenario: a failure of the technical system will occur if the component B1 or the component B2 fails and simultaneously with the failure of the component B1 or B2, as applicable, the component B3 also fails.

In what follows, the basic function assigned to the technical component B1 is represented by $f_1(t, t_1)$, where $t_1$ is the maintenance interval for B1. Similarly, $f_2(t, t_2)$ represents the basic function for B2 with an appropriate maintenance interval $t_2$ and $f_3(t, t_3)$ is the corresponding basic function for B3 with a maintenance interval of $t_3$. The fault tree in FIG. 1 can be written mathematically as a combination of these basic functions. The OR disjunction 1 shown in FIG. 1 between the functions $f_1(t, t_1)$ and $f_2(t, t_2)$ can be expressed mathematically as follows:

$$f_1(t,t_1) \vee f_2(t,t_2) = f_1(t,t_1) + f_2(t,t_2) - f_1(t,t_1) \cdot f_2(t,t_2)$$

The AND conjunction of the basic function $f_3(t, t_3)$ with the above OR disjunction can be represented mathematically by a multiplication, as follows:

$$(f_1(t,t_1) \vee f_2(t,t_2)) \wedge f_3(t,t_3) = (f_1(t,t_1) \vee f_2(t,t_2)) \cdot f_3(t,t_3)$$

This function thus corresponds to the failure probability of the overall technical system. In the embodiments described here, it can be equated to the system reliability in the sense of the independent claim.

The invention is based on the knowledge that it is possible to determine, from the magnitude of the change in the system reliability as a function of the change in the maintenance intervals for the technical components concerned, which technical component has the greatest effect on the system reliability. In the embodiments described here, the derivative of the system reliability with respect to the maintenance interval, that is with respect to the variables $t_1$ or $t_2$ or $t_3$, as applicable, is regarded as the change magnitude for the technical component concerned.

In order to determine the derivative of the basic function in equation (1), the first step is to formulate the modulo function, as follows:

For $t, t_0 \in R$ with $t_0 > 0$ there are uniquely determined numbers $q \in Z$, $r \in R$ where $$t = t_0 q + r,  \quad 1.$$

$$0 \leq r \leq t_0. \quad 2.$$

$$r =: t \bmod t_0.$$

From this it is generally possible to calculate the derivative $d/dt_0 \, f(t, t_0)$ of the basic function $f(t, t_0)$, as follows:

$$\begin{aligned}\frac{d}{dt_0} f(t, t_0) &= \frac{d}{dt_0}(1 - e^{-\lambda(t \bmod t_0)}) \\ &= -\frac{d}{dt_0} e^{-\lambda(t - qt_0)} \\ &= -e^{-\lambda t}\left[\lambda\left(\frac{dq}{dt_0} \cdot t_0 + q\right)e^{\lambda q t_0}\right] \\ &= -\lambda q e^{-\lambda(t \bmod t_0)}\end{aligned}$$

Here, the values of t considered always lie between two maintenance time points, that is $t_0$ does not divide into t.
Hence:

$$\frac{dq}{dt_0} = 0$$

Figure 2:
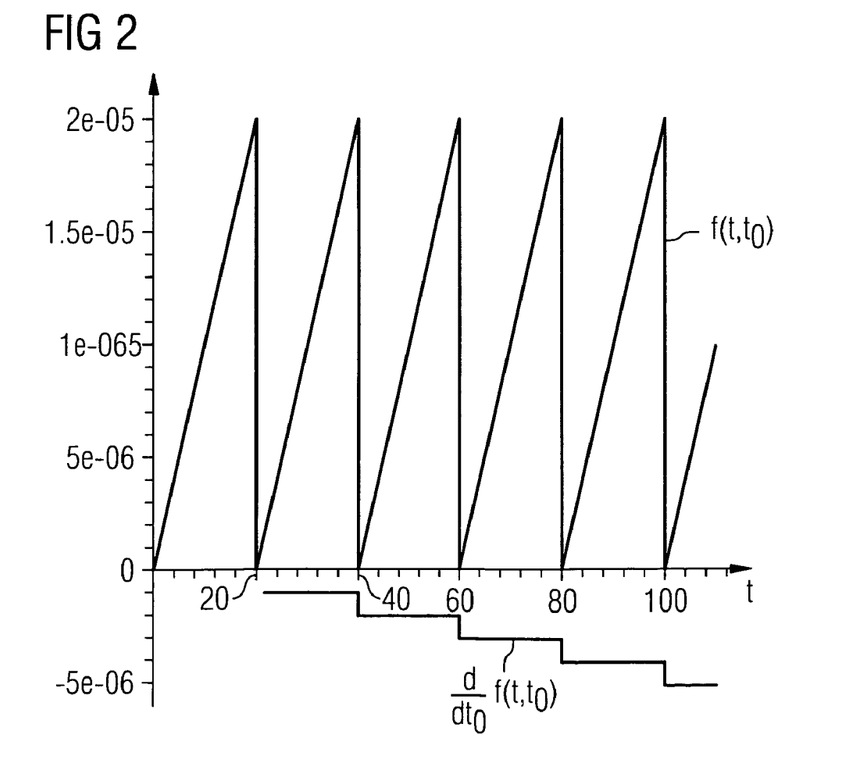
FIG. 2 a graph showing an embodiment of a basic function for a technical component and its derivative, where the basic function specifies the failure probability of the technical component.

In what follows, the basic functions considered are always such that $\lambda = 0.000001$. A corresponding basic function is shown in FIG. 2, where the choice $t_0 = 20$ has been made and the unit used for time is, for example, hours. Because an exponential distribution has been chosen for $f(t, t_0)$, the probability of a failure within a maintenance interval rises sharply and after the maintenance falls off to zero, because at this point in time the probability of a failure is essentially zero because of the maintenance which has just been carried out.

FIG. 2 also illustrates the derivative of the function $f(t, t_0)$ with respect to the maintenance interval. It will be seen that this function $d/dt_0 \, f(t, t_0)$ is zero in the first interval, from $t=0$ to 20, and then falls off very rapidly to a negative value, and then in the next maintenance interval 20 to 40 remains essentially at this value. The function exhibits the same behavior at each of the following maintenance intervals, so that a stepwise decline in the derivative function results. Hence, looking from the point in time $t=0$, the further in the future from this point in time the change lies, the greater is the effect of a change in the maintenance interval $t_0$. The further the point in time under consideration is from $t=0$ the greater is the number of maintenance processes carried out by the point in time under consideration, which produces a greater shift in the basic function if there is a change in the maintenance interval, and hence a greater sensitivity to changes of this type. The absolute value of the function $d/dt_0 \, f(t, t_0)$ is thus an expression of the effect that a change in the maintenance interval has on the behavior of the basic function $f(t, t_0)$, and hence on the reliability of the technical component.

Figure 3:
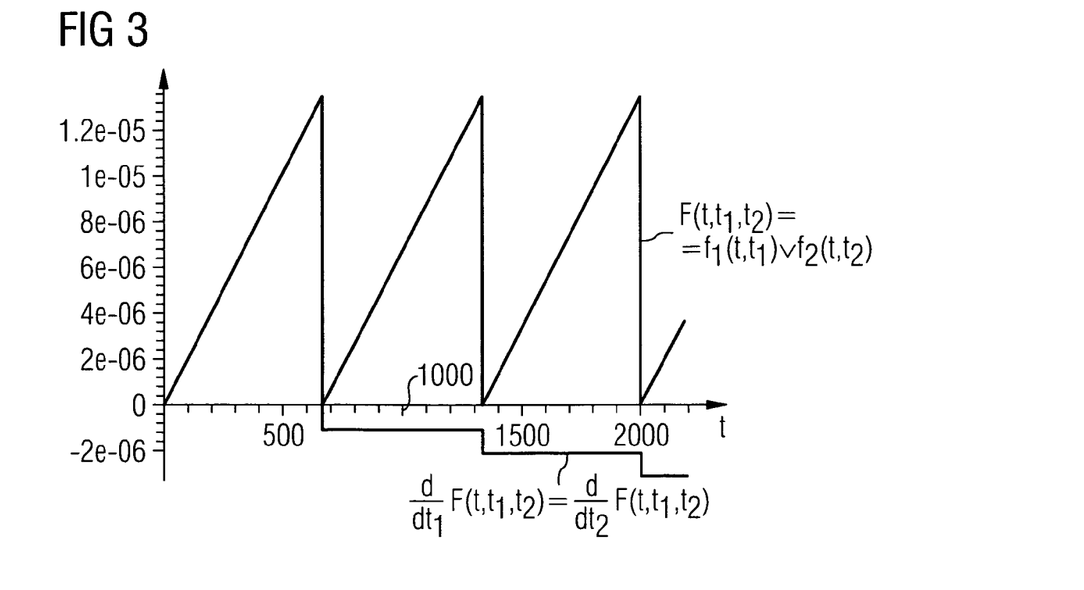
FIG. 3 a graph showing the combined failure probability from two identical basic functions as shown in FIG. 2, combined with each other by an OR disjunction, together with the corresponding derivative.

FIG. 3 shows an OR disjunction $F(t, t_1, t_2)$ of the appropriate basic functions $f_1(t, t_0)$ and $f_2(t, t_2)$, where the same maintenance interval $t_1 = t_2 = 672$ has been chosen for the two functions. Here, the values along the ordinate have been scaled by a factor of 1/100. FIG. 3 shows in addition the derivatives $d/dt_1 \, F(t, t_1, t_2) = d/dt_2 \, F(t, t_1, t_2)$. The behavior of these derivatives corresponds to the behavior of the derivative shown in FIG. 2, that is to say the absolute values of the derivatives increase in steps after each maintenance process, and within the maintenance interval are essentially constant. The failure rate (i.e. the proportion of the technical components which will fail in the next moment) is constant in the case of components which are subject to an exponentially distributed basic function. I.e. the failure rate of the components described by the functions $(f_1(t, t_0)$ OR $f_2(t, t_2))$ is constant. Hence, a change in the maintenance interval will only cause a change in the conditional failure probability if the time point under consideration then comes after a different number of maintenance intervals.

Figure 4:
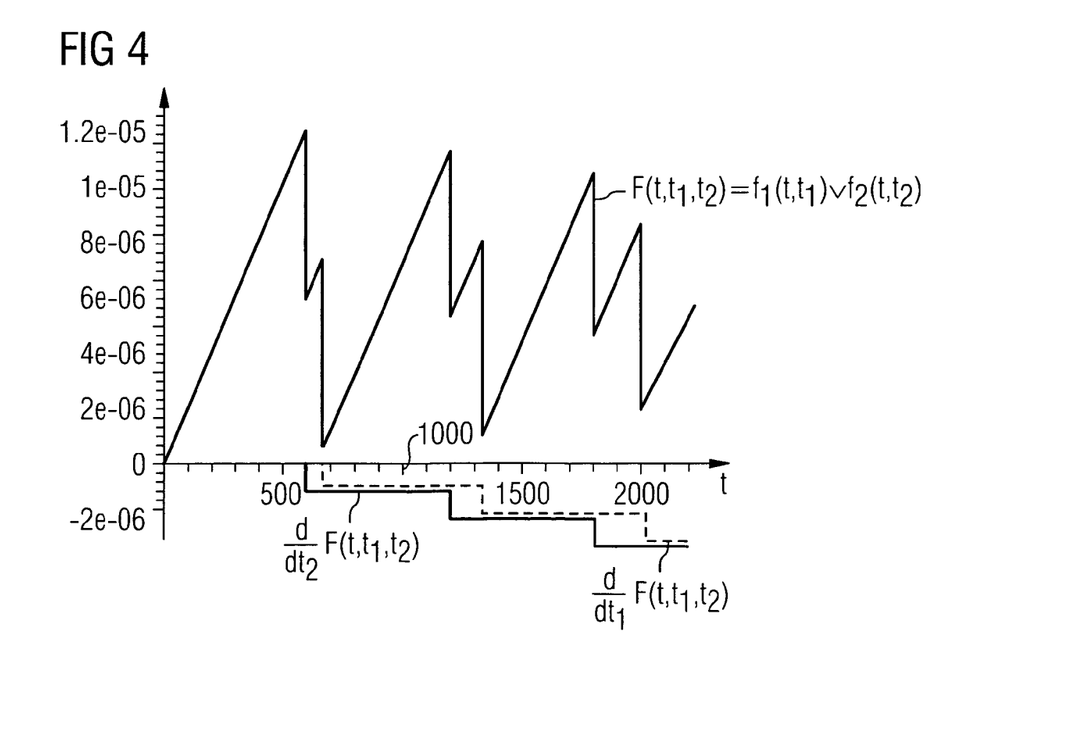
FIG. 4 an analogous graph to FIG. 3, where however the maintenance intervals in the basic functions are chosen to be different.

FIG. 4 shows an analogous diagram to FIG. 3, where however the maintenance period for the function $f_1(t, t_0)$ is chosen to be different from the maintenance interval for the function $f_2(t, t_2)$. In particular in this case: $t_1 = 670$ and $t_2 = 600$. The OR disjunction $F(t, t_1, t_2)$ illustrated is here again scaled by a factor of 1/100. FIG. 4 illustrates in addition the two derivatives $d/dt_1 \, F(t, t_1, t_2)$ and $d/dt_2 \, F(t, t_1, t_2)$ which are now different. As a result of the OR disjunction of the two functions with their different maintenance intervals, the overall function never falls to zero, because when the one technical component is maintained the other technical component is not maintained, and hence there is always a probability of failure which arises from the basic function for the unmaintained technical component. Qualitatively, the behavior of the derivatives corresponds to the behavior in FIG. 3, with a jump in the derivative $d/dt_2 \, F(t, t_1, t_2)$ resulting at the earlier maintenance time point $t_2$, while on the other hand the derivative $d/dt_1 \, F(t, t_1, t_2)$ always jumps to a new value after the passage of the longer maintenance interval $t_1$.

Figure 5:
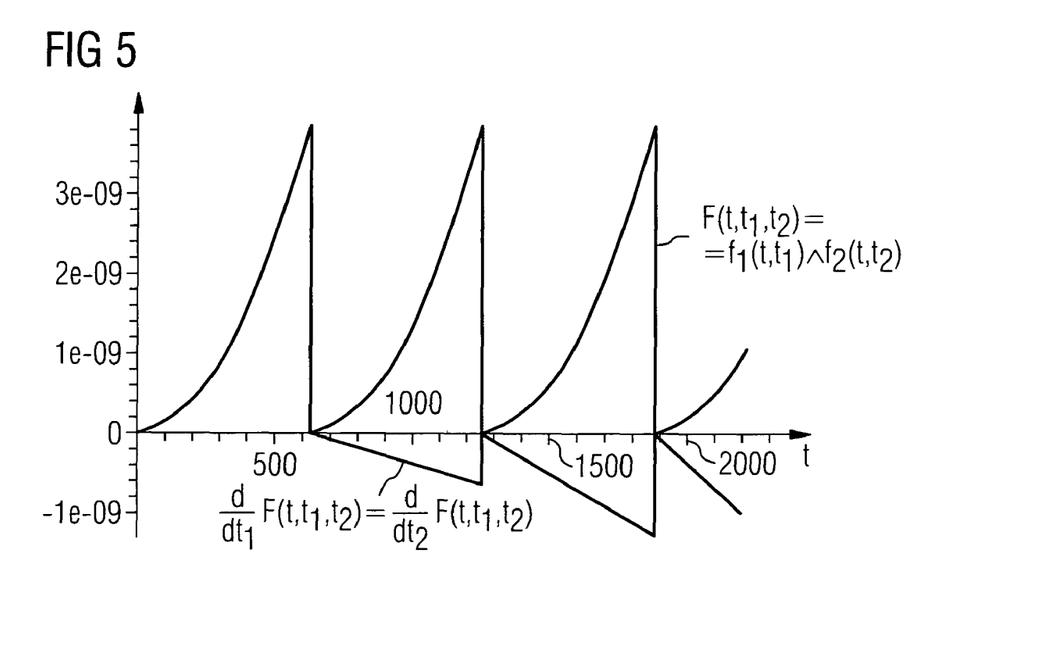
FIG. 5 a graph showing the failure probability from two identical basic functions as shown in FIG. 2, linked with each other by an AND conjunction, and its derivative.

FIG. 5 shows the AND conjunction $F(t, t_1, t_2)$ of two exponentially distributed basic functions $f_1(t, t_0)$ and $f_2(t, t_2)$. Here, the maintenance intervals $t_1$ and $t_2$ are identical. Also illustrated are the derivatives of the functions $F(t, t_1, t_2)$ with respect to $t_1$ or $t_2$ respectively, where the two derivative functions are identical. Unlike the previously discussed OR disjunction, the derivative functions are not constant within the maintenance intervals, but at the start of the maintenance interval they are always zero and then they decrease continually. In this case the decrease becomes ever steeper as the number of maintenance intervals increases. As time increases over a maintenance interval, the failure rate of the components rises because of the AND conjunction, and hence so too does the effect on the system failure probability $F(t, t_1, t_2)$. The greater slope of the derivatives at later points in time is attributable to the fact that a change in the maintenance interval causes a greater shift in the function $F(t, t_1, t_2)$ at later points in time.

Figure 6:
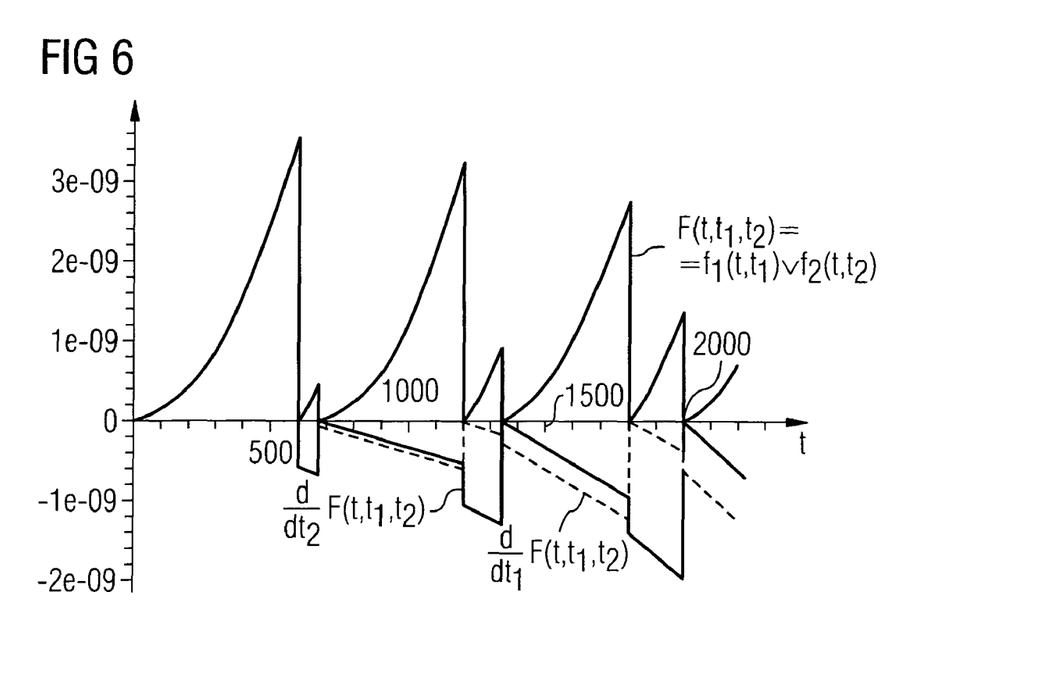
FIG. 6 an analogous graph to FIG. 5, where however the basic functions have different maintenance intervals.

FIG. 6 shows an analogous diagram to that of FIG. 5, where the functions which are combined by an AND conjunction in this case have different maintenance intervals $t_1$ and $t_2$ respectively. In particular in this case $t_1 = 670$ and $t_2 = 600$. In FIG. 6 again, the slopes of the derivatives with respect to the two maintenance intervals increase as the number of maintenance processes increases, as a result of which the sensitivity of the complete system to changes in the maintenance intervals rises.

Figure 7:
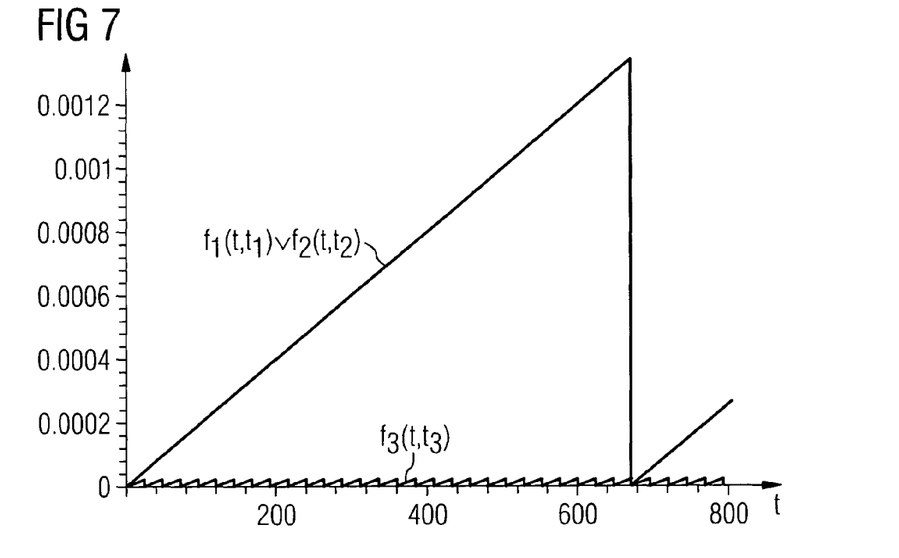
FIG. 7 a graph which shows a basic function and a combination of two basic functions for technical components, where the technical components are to be combined as shown by the fault tree in FIG. 1.
Figure 8:
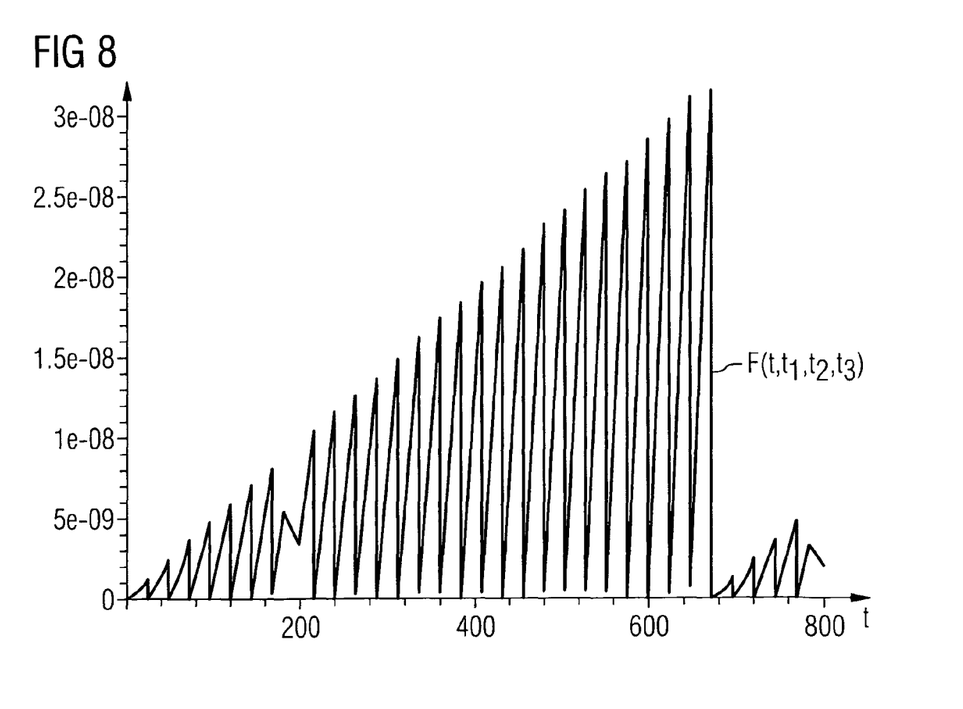
FIG. 8 a graph which shows the combination of functions as in FIG. 7 corresponding to the fault tree in FIG. 1.

FIGS. 7 to 10 show analyses of a technical system with components B1 to B3, where the failure probabilities of the individual components are combined together according to the fault tree in FIG. 1. Here, the failure probabilities are in turn based on the basic functions shown in equation (1). For all the basic functions for the components B1 to B3 it is the case that $\lambda = 0.000001$. In addition, the maintenance interval $t_1$ for component B1 has been set as 672 hours, the maintenance interval for component B2 has been set as 672 hours (that is to say, the basic functions $f_1(t, t_1)$ and $f_2(t, t_2)$ are identical), and the maintenance interval for the technical component B3 has been defined as 24 hours. FIG. 7 shows a graph of the OR disjunction of the basic functions for B1 and B2 together with a graph of the basic function for B3. FIG. 8 shows the overall system failure probability F(t, $t_1$, $t_2$), which represents an AND conjunction, and hence a multiplication, of the two graphs shown in FIG. 7.

Figure 9:
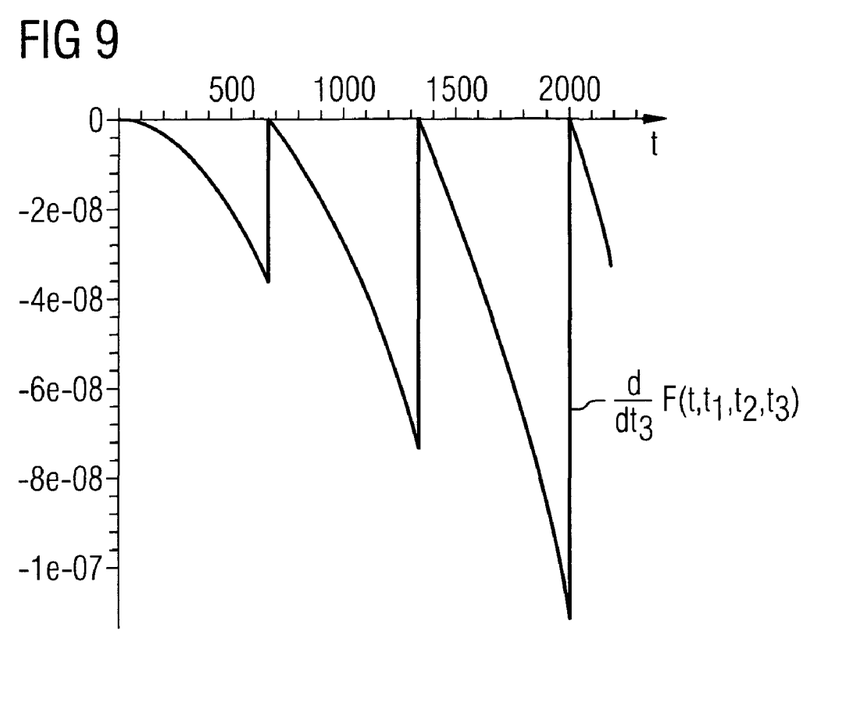

FIG. 9 shows the derivative of the graph in FIG. 8 with respect to the maintenance interval $t_3$. It will be seen that, due to the AND conjunction 2, the change in the maintenance interval for the technical component B3 immediately after the maintenance of components B1 or B2 at time points $t_1=t_2=672$ has little effect on the overall system failure probability, because at these points in time the overall system failure probability is dominated by the components B1 and B2 which have just undergone maintenance.

Figure 10:
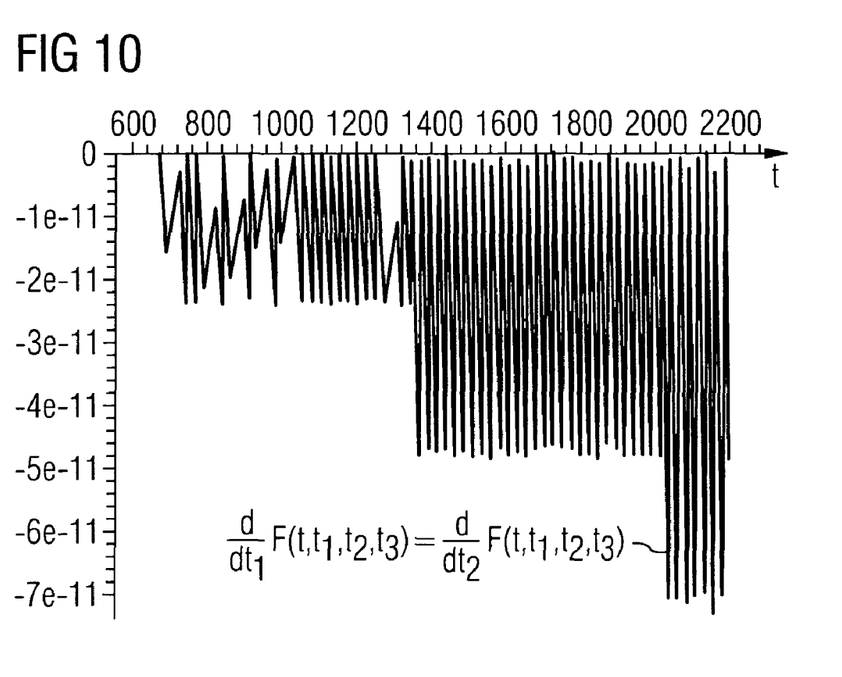
FIG. 10 graphs which show the derivatives of the function shown in FIG. 8 with respect to different maintenance intervals.

FIG. 10 shows the derivative with respect to $t_1$ or $t_2$, as applicable, of the graph shown in FIG. 8. It will be seen that this function oscillates, this being attributable to the AND conjunction of the technical component B3, which has a very short maintenance interval of $t_3=24$, with the components B1 and B2.

In the embodiment of the invention described here, the derivative of the overall probability function with respect to the maintenance intervals is used for assessing which of the corresponding technical components, B1 to B3, has the greatest effect on the behavior of the overall system, that is on the failure probability of the overall system. For the purpose of determining the magnitude of this effect it is possible, for example, to use the integral of the appropriate derivative functions. For the derivative functions shown in FIG. 9 and FIG. 10, the result of doing this is that the integral of the derivative function with respect to $t_3$ is significantly larger than those of the derivative functions with respect to $t_1$ or $t_2$ respectively. This means that the component B3 has a significantly greater effect on the overall system failure probability for the technical system. This is also plausible, because the maintenance interval for this component is significantly shorter, and hence a change in its maintenance interval has a greater effect on the overall system. Instead of calculating the integral to determine the effect of an individual maintenance interval on the overall failure probability, it is also possible to use the maximum value of the absolute value of the appropriate derivative functions over a predefined time interval. Here too the result would be that the maintenance interval $t_3$ has the greatest effect on the overall system. Alternatively, it is also possible to define a fixed time point, and to compare with each other the values of the derivative functions at this point. The technical component with the derivative function which has the greatest absolute value at this point in time is then the component with the greatest effect on the overall system.

The invention claimed is:

1. A method for computer-aided analysis of a reliability of a technical system with a plurality of technical components, comprising:

describing the reliability of each of the plurality of technical components by a component function $f$ for each component under consideration of the plurality of technical components, wherein the component function is described by a distribution function comprising parameter t representing an operating time of the technical system, parameter $t_0$ representing a maintenance interval for the technical component under consideration, and parameter $\lambda$ representing a parameter that describes the reliability of the component under consideration and wherein the distribution function comprises an exponential function represented as $f(t, t_0)=1-e^{-\lambda(t\,mod\,t_0)}$ wherein $t\,mod\,t_0$ represents a modulo function;

determining a system reliability for the technical system in accordance with a system reliability function F comprising a mathematical combination of the reliabilities of the components;

determining for each of at least some of the components a change magnitude which is a measure of the change in the system reliability as a function of the change in the maintenance interval for the component under consideration; and determining, using a computer, a factor for the effect of the component concerned on the system reliability via the change magnitude for each of at least some of the components, wherein, based on the factors determined, at least one component is identified having a greater effect on the system reliability than the other.

2. The method as claimed in claim 1, wherein the maintenance interval for a component under consideration differs from maintenance intervals for other components.

3. The method as claimed in claim 1, wherein the reliabilities of the components are variables which characterize the probability of a fault and/or failure and/or the availability of the component concerned.

4. The method as claimed in claim 1, wherein the component functions comprise at least one probability distribution function.

5. The method as claimed in claim 4, wherein the probability distribution function is selected from the group consisting of: a Weibull distribution, a gamma distribution, a lognormal distribution, an exponential distribution and combinations thereof.

6. The method as claimed in claim 1, wherein the mathematical combination of the reliabilities of the components comprises using a Boolean algebra.

7. The method as claimed in claim 1, wherein each of the change magnitudes comprises the derivative of the system reliability with respect to the maintenance interval concerned.

8. The method as claimed in claim 1, wherein the factors for a plurality of the components comprise in each case an integral, with respect to the maintenance interval of the change magnitude for the component concerned.

9. The method as claimed in claim 1, wherein the factors for each of the plurality of the components comprise the maximum value of the absolute value of the change magnitude for the component concerned in an interval of the operating time of the technical system.

10. The method as claimed in claim 1, wherein the factors for each of the plurality of the components comprise the absolute value of the change magnitude for the component concerned at a predefined value of the operating time of the technical system.

11. The method as claimed in claim 1, wherein the reliability of a power station, and/or of a technical control system is analyzed.

* * * * *

UNITED STATES PATENT AND TRADEMARK OFFICE
CERTIFICATE OF CORRECTION

| | | |
|---|---|---|
| PATENT NO. | : 8,131,505 B2 | Page 1 of 1 |
| APPLICATION NO. | : 11/992711 | |
| DATED | : March 6, 2012 | |
| INVENTOR(S) | : Petra Ehlers, Wolfram Klein and Ariane Sutor | |

It is certified that error appears in the above-identified patent and that said Letters Patent is hereby corrected as shown below:

On the title page Item (87), line 2, PCT Pub. Date, replace the second line "PCT Pub. Date: Dec. 4, 2007" with --PCT Pub. Date: April 12, 2007--

Signed and Sealed this
Sixteenth Day of April, 2013

Teresa Stanek Rea
*Acting Director of the United States Patent and Trademark Office*